Aug. 28, 1934.  C. PRESS  1,971,621
BRAKE
Filed June 29, 1931

INVENTOR.
CARL PRESS
BY
Jn. W. McConkey
ATTORNEY

Patented Aug. 28, 1934

1,971,621

UNITED STATES PATENT OFFICE 1,971,621

BRAKE

Carl Press, South Bend, Ind., assignor to Bendix Brake Company, South Bend, Ind., a corporation of Illinois Application June 29, 1931, Serial No. 547,487

6 Claims. (Cl. 188—152)

This invention relates to brakes, and is illustrated as embodied in an internal expanding automobile brake having novel fluid-pressure applying means. In some of its aspects, the invention is especially adapted for use in a brake of the shiftable-anchorage type, i. e. having friction means anchoring at one end when the drum is turning in one direction and at the other end when the drum is turning in the other direction, and accordingly the drawing shows a brake of this type, although some features of the invention are equally useful in brakes of other types.

An object of the invention is to provide the novel fluid-pressure device with a mechanical actuator engaging the brake shoes or their equivalents, and shown as a cam or lever, or a wedge, floatingly pivoted on a lateral extension of the fluid piston. The extension may be in the form of a pivot extending through a slot in the side of the cylinder. Where used on a shiftable-anchorage brake, I prefer to use the brake anchorage (shown as a pair of spaced anchor posts) to secure the cylinder to the brake backing plate.

The above and other objects and features of the invention, including various novel combinations of parts and desirable particular constructions, will be apparent from the following description of the illustrative embodiments shown in the accompanying drawing, in which.

Figure 1:
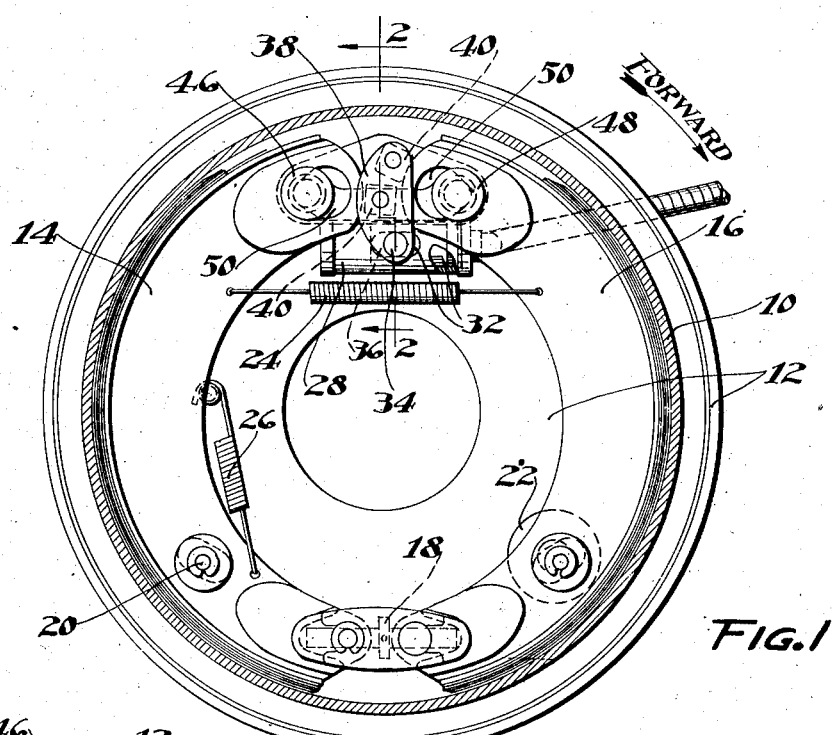
Figure 1 is a vertical section through the brake, just inside the head of the brake drum, and showing the brake shoes in side elevation.
Figure 2:
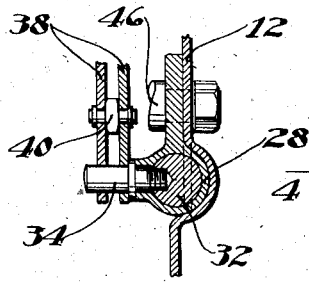
Figure 2 is a partial section on the line 2—2 of Figure 1, showing the mounting of the mechanical actuator, which in this embodiment is a floating cam lever.

In the embodiment of Figures 1 and 2, the brake includes a rotatable drum 10 (turning clockwise when the car is moving forward), at the open side of which is a support such as a backing plate 12, and within which is the brake friction means. The illustrated friction means includes a pair of floating shoes 14 and 16 connected by a suitable adjustable pivot connection 18, and provided with one or more steady rests 20 and with an adjustable positioning device such as an eccentrically mounted roller 22.

The shoes are urged away from the drum by a return spring 24 tensioned between them, and may have an auxiliary return spring 26 tensioned between the backing plate and one of the shoes, and which takes the weight of the shoes and also urges shoe 14 against its anchor so that in forward braking this shoe never leaves its anchor. Shoe 14 anchors at its upper end when the drum is turning clockwise, and shoe 16 anchors at its upper end when the drum is turning counterclockwise.

According to an important feature of the present invention, the brake is provided with a novel fluid pressure device shown as including a horizontal cylinder 28 (Figures 1 and 2), connected to the hydraulic system on the chassis by the usual flexible pipe line, and containing a piston or the like 32 having a lateral extension or pivot 34 passing through a slot 36 in the side of the cylinder.

On the pivot 34 is mounted, in Figures 1 and 2, a pair of parts 38 forming a cam lever extending upwardly at right angles to the cylinders, and between which are pivoted thrust parts such as blocks 40 engaging the respective shoe ends.

I prefer to fasten cylinder 28 securely to the backing plate by means of the brake anchorage, for example by means of a pair of anchor posts 46 and 48 passing through elongated openings 50 in the ends of the shoes.

Supply of liquid under pressure to the cylinder 28 causes movement of the piston 32 and through the pivot 34 exerts a turning force upon the parts 38. Turning of said parts 38 acts through the thrust blocks 40 to spread the shoes 14 and 16 and apply the shoes to the drum. Depending upon the direction of rotation of the drum, one or the other of the shoes anchors upon one of the anchor posts 46 and 48, thus exerting a retarding force upon the movement of the drum 10.

Figure 3:
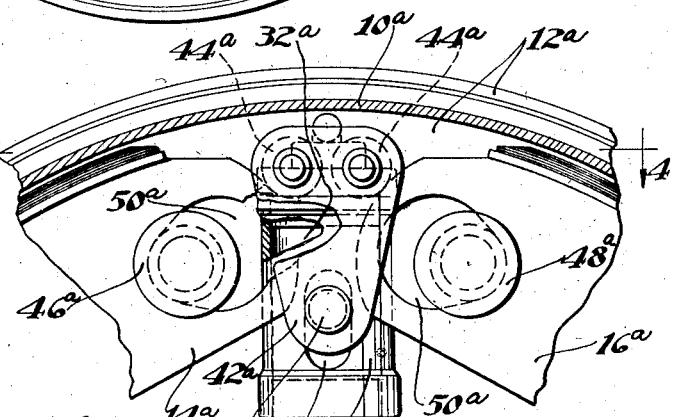
Figure 3 is a partial section corresponding to the top of Figure 1, but showing a wedge used instead of a cam lever.
Figure 4:
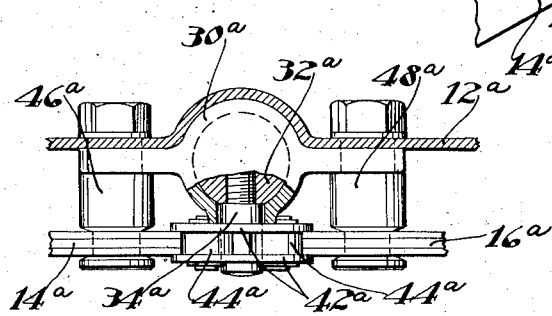
Figure 4 is a partial section on the line 4—4 of Figure 3, showing the mounting of the wedge.

In the embodiment shown in Figures 3 and 4, the brake includes a rotatable drum 10a (turning clockwise when the car is moving forward), at the open side of which is a support such as a backing plate 12a, and within which is the brake friction means. The illustrated friction means includes a pair of floating shoes 14a and 16a. The shoe 14a anchors at its upper end upon an anchor post 46a when the drum is turning clockwise and the shoe 16a anchors at its upper end upon an anchor post 48a when the drum is turning counterclockwise.

The brake is provided with a vertical cylinder 30a connected to the hydraulic system on the chassis by a flexible pipe line similar to that shown in Figure 1 and containing a piston or the like 32a having a lateral extension or pivot 34a passing through a slot 36a in the side of the cylinder.

The pivot 34a carries a pair of parts 42a along side of the cylinder, and between these parts there are pivoted thrust parts such as the rollers 44a. The rollers 44a engage the rounded and converging ends of the shoes, the whole forming a floating wedge and forcing the ends of the shoes apart.

Liquid supplied under pressure to the cylinder 30a moves the piston 32a downward and thus through the rollers 44a forces the shoes 14a and 16a into contact with the drum 10a. The shoes anchor on the anchor posts 46a and 48a and thus retard the rotation of the drum 10a.

While two illustrative embodiments of the invention have been described in detail, it is not my intention to limit the scope of the invention to those particular embodiments, or otherwise than by the terms of the appended claims.

I claim:

1. An operator for a brake or the like comprising a cylinder, a piston in the cylinder having an extension through the side of the cylinder, and a wedge pivoted on said extension.

2. An operator for a brake or the like comprising a cylinder, a piston in the cylinder having an extension through the side of the cylinder, and a cam device pivoted on said extension.

3. A brake comprising, in combination with a drum, friction means anchoring at one end when the drum is turning in one direction and at the other end when the drum is turning in the other direction, a fluid-pressure operating device mounted adjacent said ends, and a floating brake-operating cam device mounted on and operated by said fluid-pressure device.

4. A brake comprising, in combination with a drum, friction means anchoring at one end when the drum is turning in one direction and at the other end when the drum is turning in the other direction, a fluid-pressure operating device mounted adjacent said ends, and a floating brake-operating wedge mounted on and operated by said fluid-pressure device.

5. A brake comprising, in combination with a drum, friction means having adjacent separable ends, a fluid-pressure operating device mounted adjacent said ends, and a floating brake-operating cam device mounted on and operated by said fluid-pressure device.

6. A brake comprising, in combination with a drum, friction means having adjacent separable ends, a fluid-pressure operating device mounted adjacent said ends, and a floating brake-operating wedge mounted on and operated by said fluid-pressure device.

CARL PRESS.